Oct. 19, 1954

J. H. GRIMSHAW 2,691,929

CONTROL FOR TRACTOR POWER LIFTS

Filed April 5, 1951

John H. Grimshaw
INVENTOR.

Oct. 19, 1954   J. H. GRIMSHAW   2,691,929
CONTROL FOR TRACTOR POWER LIFTS
Filed April 5, 1951   2 Sheets-Sheet 2
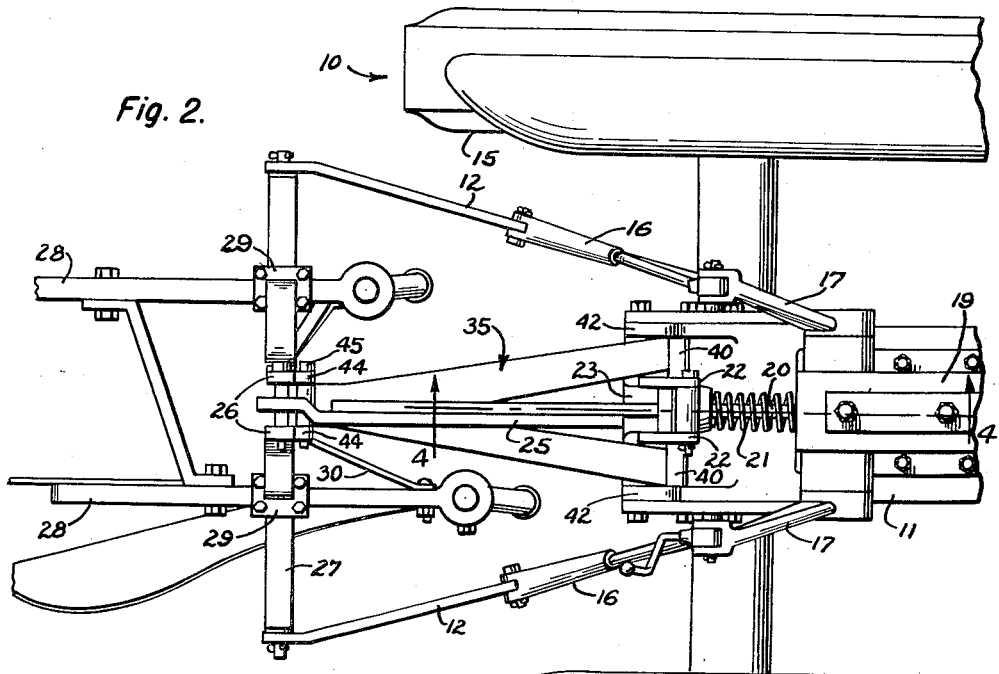
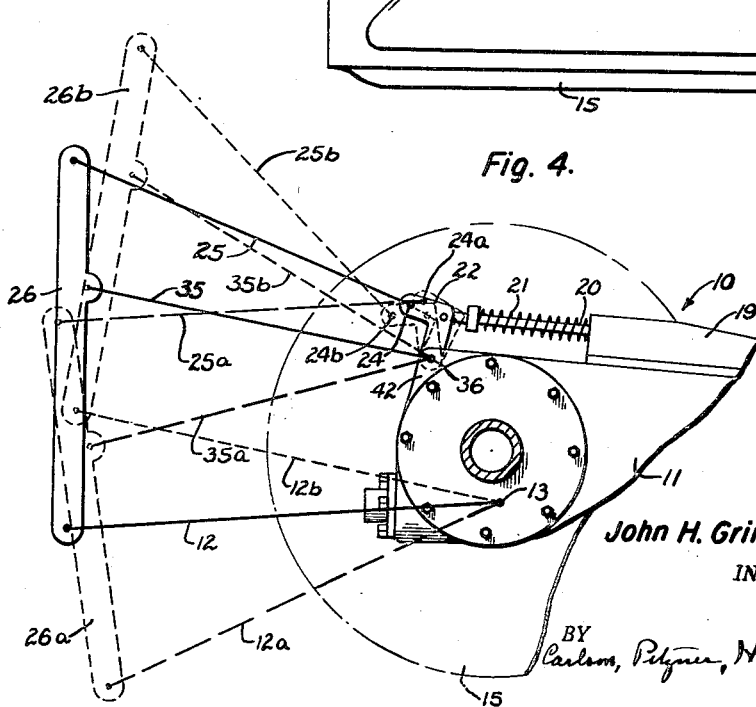
John H. Grimshaw
INVENTOR.

Patented Oct. 19, 1954

2,691,929

UNITED STATES PATENT OFFICE 2,691,929

CONTROL FOR TRACTOR POWER LIFTS

John H. Grimshaw, Cedar City, Utah, assignor to Harry Ferguson, Inc., Detroit, Mich., a corporation of Delaware Application April 5, 1951, Serial No. 219,476

8 Claims. (Cl. 97—46.03)

The invention relates to power operated lift mechanisms for tractors and more particularly to improved controls for such mechanisms. The present application is a continuation-in-part of my copending application Serial No. 140,261, filed January 24, 1950, now abandoned.

One object of the invention is to provide a control arrangement for tractor power lifts whereby the latter may be operated to raise or lower an implement or other load and maintain it in a position corresponding to the position of a manually shiftable control element.

More particularly, it is an object of the invention to provide a type of control for tractor power lifts such that the load will be raised or lowered or, in other words, will "follow" accurately the movements of a manually shiftable control element such as a hand lever and assume a final position within its range of travel corresponding to the position in which the element is set.

The control arrangement of the present invention is particularly applicable to tractor power lifts having a load-responsive type of automatic control such as that disclosed in the Ferguson Patent No. 2,118,180 issued May 24, 1938. The instant controls may be incorporated in the lift initially provided on the tractor, or it may take the form of a conversion attachment for application to existing tractors for connecting such power lifts to a position type of control.

Another object of the invention is to provide such an attachment which is simple and inexpensive in construction and which can be quickly and easily applied to or detached from the tractor.

Other objects and advantages of the invention will become apparent from the following detailed description of the preferred embodiment illustrated in the accompanying drawings, in which:

Fig. 2 is a top plan view of the tractor and implement lift shown in Fig. 1.

Fig. 4 is a diagrammatic view illustrating the relative positions of various parts of the linkage of the implement lift and the control elements associated therewith.

Figure 1:
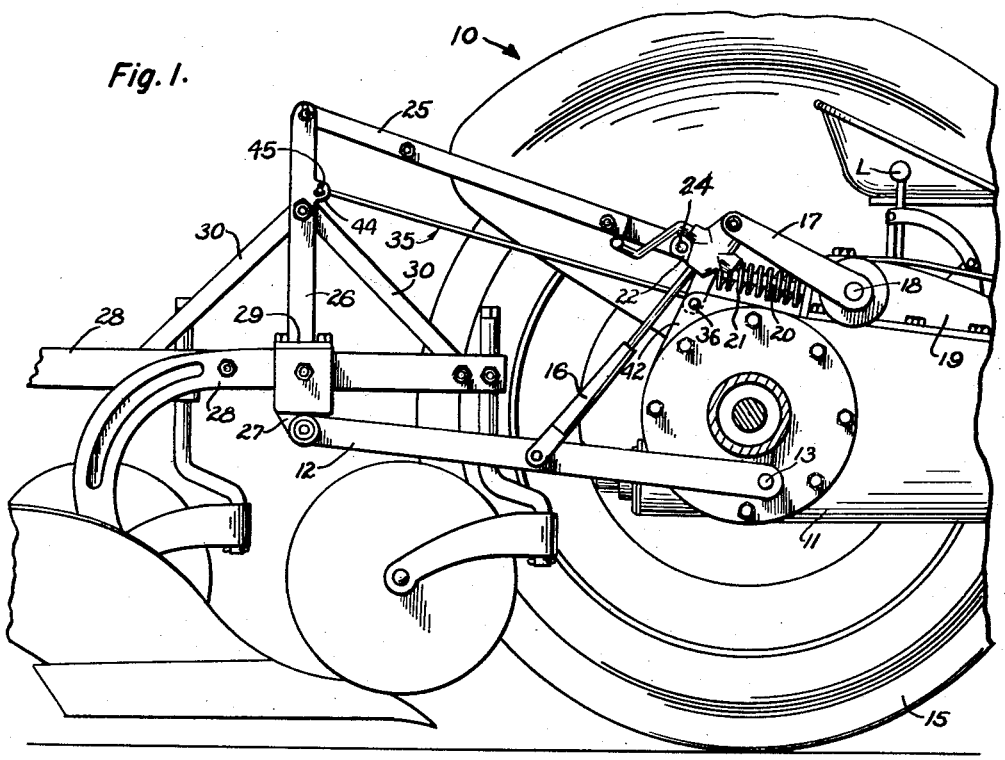
Figure 1 is a side elevational view of the rear end portion of a conventional lightweight agricultural tractor equipped with a power operated implement lift and showing the control arrangement of the present invention applied thereto.
Figure 3:
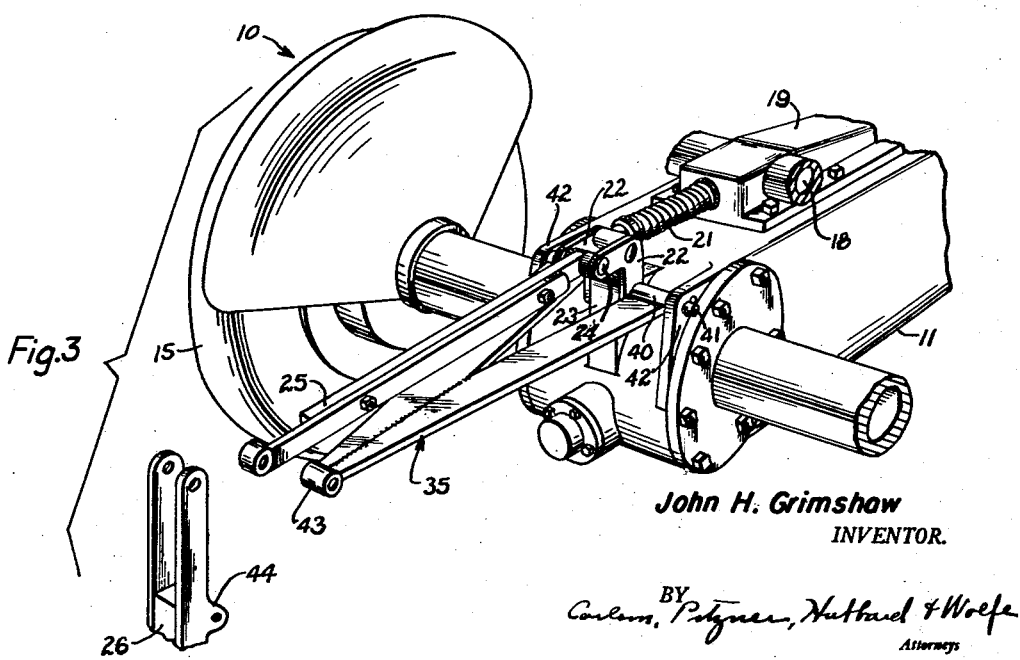
Fig. 3 is a fragmentary exploded perspective detail view showing a portion of the associated parts of the tractor, the power operated implement lift and a part of the controls for the lift.

While the invention is susceptible of various modifications and alternative constructions, there is shown in the drawings and will herein be described in detail a preferred embodiment, but it is to be understood that it is not thereby intended to limit the invention to the particular form disclosed, but it is intended to cover all modifications and alternative constructions falling within the spirit and scope of the invention as expressed in the appended claims.

Referring to the drawings, the tractor shown by way of illustration is a conventional lightweight agricultural tractor 10 having a body or center housing 11. At the rear end of the tractor there is a draft linkage and implement lift comprising a pair of trailing lower or draft links 12 pivoted at their forward ends as at 13 on the rear portion of the tractor body to swing generally vertically. The pivotal axis for the draft links is located below and slightly forward of an axle for the tractor's pneumatically tired rear drive wheels 15.

Drop links 16 connect respective ones of the draft links 12 to a pair of crank arms 17 rigid with a transverse rock shaft 18 journaled in a cover plate 19 mounted on the top of the center housing 11. A power operated actuator, enclosed within the center housing is associated in well-known manner with the rockshaft 18 for rocking the shaft to raise or lower the draft links and the implement or other load attached thereto.

In the "Ferguson System" power lift, the actuator for the rockshaft 18 is hydraulically actuated and provision is made for controlling its operation in accordance with the ground reaction on the implement associated with the draft linkage. This is a load-responsive type of control and the mechanism for effecting such control includes a spring biased, shiftable control element herein shown as an endwise slidable rod 20 biased by a main control spring 21. In the particular embodiment illustrated, the forward end of the rod 20 extends into the cover plate 19 for association with other elements of the control mechanism, as explained in the Ferguson patent above referred to. The outer end of the control rod is pivotally connected to the intermediate portion of an L-shaped shackle 22 which, in turn, is pivoted upon a lug 23 upstanding at the rear end of the center housing 11.

The arrangement of the control mechanism is such that inward movement of the control rod against the force exerted by the spring 21 initiates operation of the actuator to swing the draft links upwardly. The associated elements of the controls act to interrupt movement of the links when a balanced condition is reached, the control rod thus being located in what may be termed a neutral position. Any change in the force exerted on the control rod to shift it in one direction or the other from the neutral position is thus effective to initiate operation of the actuator to raise or lower the links as required.

The action of the load-responsive controls above referred to may be modified by a manual control element such as a quadrant lever L (Fig. 1) pivoted on the center housing 11 for easy access by the operator of the tractor. In effect, this hand lever is operative to progressively change the neutral position of the control element and thereby determine the draft load to be maintained on the draft linkage.

The reactive force for operating the controls in the above manner is conventionally transmitted to the control rod 20 through the medium of a rigid top link 25 having means at its forward end for pivotal connection with the shackle 22 as at 24 and having its other end connected with the implement in a manner such that the ground reaction on the ground engaging elements of the implement tends to tilt the implement forwardly and exerts a forward thrust on the top link. For this purpose the free ends of the draft links 12 and the corresponding end of the top link 25 are connected by an upright rigid member or strut 26 to swing in unison. This strut may constitute a part of the implement frame or may be attached thereto in any suitable manner so as to tilt with the implement.

By way of illustration, the strut 26 has been shown as secured centrally of a rigid cross member or drawbar 27 adapted to carry one or more ground engaging elements. The drawbar 27 is arranged for pivotal connection at opposite ends to the respective lower links 12 and the upper end of the strut is pivotally connected to the top link 25.

In the illustrative embodiment, the drawbar 27 constitutes a part of the frame of a conventional two-bottom plow, plow bottoms being carried on fore-and-aft beams 28 attached to the drawbar by clamps 29. Diagonal braces 30 extending between the beams and the strut 26 hold the latter rigid with the implement framework.

When the implement is drawn forwardly with the plow bottoms in working position, the ground reaction on the plow bottoms tends to tip the implement and the strut 26 forwardly and thus applies a forward thrust to the top link 25. When this thrust exceeds the value determined by the position of the hand lever L, the actuator for the power lift mechanism is operated to raise the linkage and attached implement until a condition of balance is again attained. Upon decrease in ground reaction, the controls are shifted rearwardly by the main control spring to cause the linkage and implement to be lowered.

In accordance with the invention, the load-responsive type of control above referred to is quickly and easily changed to a position-responsive type control by application of a simple conversion attachment. More particularly, the attachment modifies the action of the controls so that the draft links and attached load follow with fidelity the movements of the quadrant lever 24 and automatically take a position in their range of movement corresponding to that in which the lever is set in its range of movement. This result is obtained by interposing an auxiliary member 35 between the tractor and the strut 26 in a manner effective to constrain the upper end of the strut to swing fore-and-aft or toward and from the tractor as the strut is lowered or raised by the draft links 12. Such swinging movements are then utilized to actuate the control rod 20 through the medium of the top link 25.

The dimensioning of the auxiliary member 35 and the location of the points at which it is connected to the tractor and to the strut 26 are important factors in attaining the desired results. The geometry of the linkage formed by application of the tension member to the lifting mechanism will be readily seen by reference to Fig. 4 of the drawings. By reference to the drawing it will be observed that the auxiliary member is substantially shorter than the draft links 12 and that its forward end is pivotally connected to the tractor at a point 36 located above and rearwardly of the pivot 13 for the draft links and below the point of connection 24 of the top link 25 with the shackle 22. At its rear end the auxiliary member is connected with the strut 26 at a point spaced substantially from the upper end of the strut which is connected to the top link 25.

When the draft links are moved vertically the lower end of the strut 26 will thus swing in an arc centered on the pivot 13 for the draft links while the intermediate point to which the auxiliary member 35 is connected will swing about an arc centered on the pivot 36 for the member. Due to the dimensioning of the parts and the location of the pivot points, the spacing of the upper end of the strut 26 from the rear portion of the shackle 22 will decrease as the links are lowered and increase as the links are raised. Through the connection afforded by the top link 25 and the shackle 22, the control rod 20 is correspondingly shifted.

In the present instance, a change in the position of the quadrant lever L initiates operation of the power actuator to raise or lower the linkage and the shifting of the control rod as above described is always toward the neutral position at which operation of the power actuator is interrupted. Preferably, the arrangement is such that when the quadrant lever L is set in its lower limit position the linkage is dropped to its lowest position as indicated in Fig. 4 by the broken line representation in which the elements are identified by the subscript $a$. It will be observed that in this position the pivot connection $24a$ of the top link with the shackle 22 is shifted forwardly and the control rod 20 is similarly displaced.

As the quadrant lever is rocked toward its upper limit position, the linkage is elevated through the intermediate position in which it is shown in full lines in Fig. 4 to its upper limit position shown in broken line representation with the elements identified by the subscript $b$. Since the links 12 and 35 are rigid, the distance between the upper end of the strut 26 and the pivot connection 24 of the top link and shackle increases in the upward movement of the strut and the shackle is rocked rearwardly as indicated by the position $24b$ of the pivot and correspondingly sets the controls through the medium of the control rod. Setting of this quadrant lever L in any position intermediate the limit positions results in a corresponding following movement of the linkage with the accompanying shifting of the controls to neutral position when the linkage position corresponds to that of the quadrant lever.

As is characteristic of the hydraulic lift provided in the "Ferguson System," the power actuator acts to move the linkage up or down in accordance with the movements of the quadrant lever L. Through the linkage provided by the present invention, the controls are simultaneously shifted toward a neutral position tending to interrupt the operation of the actuator. The length of the auxiliary member 35 is so proportioned with respect to the length of the draft links 12 and the points of connection of that member with the tractor and with the strut are so positioned, that the movements imparted to the control rod are accurately proportioned to the vertical movements of the draft links. Moreover the relationship of the parts is such that the movement of the draft links through their entire vertical range is effective to shift the control rod 20 through its normal range. Since the latter is coordinated with the position of the quadrant lever L, operation of the power actuator will be interrupted automatically when the position of the draft links and the load attached thereto conforms to the position in which the quadrant lever is set.

It will be evident from the foregoing that the primary function of the auxiliary member 35 is to constrain the upper end of the strut 26 to swing fore-and-aft in response to vertical movement of the draft links. The auxiliary member may therefore embody any suitable construction for the performance of that function. In the particular embodiment illustrated, the auxiliary member is in the form of an elongated rigid generally V-shaped link. For convenience of connecting with conventional tractors its bifurcated end is formed with sleeves 40 adapted to receive pivot pins 41 inserted through suitable holes in the lug 23 and in companion lugs 42 spaced laterally therefrom. Such lugs are normally provided on the tractor center housing for convenience in connecting certain types of implements thereto.

At its rearward end the auxiliary member is provided with suitable means for pivotal attachment to the strut 26. As herein shown, this means may comprise a sleeve 43 formed on the rear end portion of the member adapted to fit between forwardly projecting ears 44 on the strut 26 and to receive a pivot pin 45 inserted through the alined holes in the ears. It will be evident that any other suitable means may be utilized to effect the connection between the auxiliary member and the strut which will permit relative pivoting of the parts as above described.

It will be apparent from the foregoing that the invention provides means of a novel and advantageous character for controlling a tractor power lift mechanism so that a load may be quickly and accurately raised or lowered to any manually selected position within the range of the mechanism. In other words, the improved controls provide for automatically operating the mechanism to cause the load to follow with fidelity the movements of a manually shiftable control element such as a hand lever. The means for effecting such control is simple and inexpensive to produce yet efficient and reliable in operation. It may be incorporated in the tractor as original equipment or may be applied thereto as an attachment. The ease of installation and particularly the fact that no changes or modifications of the tractor or power mechanism are required for that purpose enable it to be applied readily to existing tractors equipped with power lift mechanisms.

I claim as my invention:

1. For combination with a tractor having a pair of draft links pivoted at its rear end portion for vertical swinging movement, a power operated shaft journaled on the tractor above the pivots for said links, crank arms extending radially from said shaft, drop links connecting said crank arms with said draft links for swinging the latter in response to the rocking of said shaft, control mechanism for controlling the rocking of said shaft including a spring biased control rod shiftable in either direction from a neutral position to initiate the raising or lowering of the draft links, a hand lever settable to variably determine the neutral position of the control mechanism, a cross member connecting the free ends of said draft links, a rigid strut secured at its lower end to said cross member to swing vertically with the draft links, a rigid auxiliary member pivotally connected to the tractor and to said strut at a point spaced from the upper end of the strut, said auxiliary member being substantially shorter than said draft links so as to constrain the upper end of said strut to swing fore-and-aft as the strut is raised or lowered by the draft links, and a rigid top link connected between the upper end of said strut and said control rod operative to transmit the fore-and-aft movements of the strut to the control rod to move the rod to the neutral position corresponding to the setting of said hand lever.

2. For combination with a tractor having a draft link trailingly pivoted thereon for elevation by a power lift device and having a load-responsive type of automatic control including a spring urged slidable control rod in which movement in one direction from a neutral position causes raising of the draft link and movement in the other direction causes lowering of the draft link, a rigid top link having means at its forward end for pivotal connection with said control rod, a rigid strut connecting the said draft link and said top link so that the links swing vertically in unison with one another, and a conversion attachment for converting said load-responsive control to a position responsive type of control comprising, in combination: an auxiliary member having a length substantially less than the length of said draft link, connecting means at one end of said member for attachment to said strut at a point spaced from the connection with said top link, and means at the other end of said member for attachment to the tractor at a point between said draft link and said control rod, said auxiliary member being operative to constrain the upper end of said strut to swing fore-and-aft relative to the tractor when the draft link is raised or lowered, the swinging movements of the upper end of said strut being transmitted through said top link to said control rod.

3. For use with a tractor having a draft link trailingly pivoted thereon for elevation by a power lift device and having a load-responsive type of automatic control including a spring urged slidable control rod in which movement in one direction from a neutral position causes raising of the draft link and movement in the other direction causes lowering of the draft link, a rigid top link having means at its forward end for pivotal connection with said control rod, a conversion attachment for converting said load-responsive control into a position responsive type of control comprising, in combination: an elongated rigid member connecting said draft link and said top link so that the links swing vertically in unison with one another, and means connecting an intermediate portion of said rigid member with the tractor so as to constrain the upper end of the member to swing fore-and-aft relative to the tractor as the links are raised or lowered, said swinging of the member being effective to correspondingly shift said control rod with respect to its neutral position.

4. For use with a tractor having a draft link trailingly pivoted thereon for elevation by a power lift device and having a load-responsive type of automatic control including a spring biased control element operative when displaced against the biasing force to initiate the raising or lowering of the draft link in accordance with the direction of displacement, a conversion attachment for converting said load-responsive control into a position responsive type of control comprising: a rigid upright strut arranged for pivotal attachment at its lower end to said draft link, a rigid link having connecting means at opposite ends for connection respectively with the upper end of said strut and with said spring biased element, an auxiliary member extending from said strut to the tractor, said auxiliary member being connected with said strut intermediate said draft and rigid link connections and being connected with the tractor between said draft link and said control element, the effective length of said auxiliary member being less than that of said draft link whereby the upper end of said strut is constrained to swing fore-and-aft relative to the tractor when the strut is raised or lowered by the draft link and to displace said control element an amount which is proportioned to the vertical movement of the strut.

5. For use with a tractor having a draft link trailingly pivoted thereon for elevation by a power lift device and having a load-responsive type of automatic control including a spring biased control element operative when moved against the biasing force to initiate the raising of the draft link, a conversion attachment for converting said load-responsive control into a position responsive type of control comprising: a rigid upright strut arranged for pivotal attachment at its lower end to said draft link at a point spaced from the pivot of the draft link, a rigid top link having connecting means at opposite ends for connection respectively with the upper end of said strut and with said spring biased control element, and means connected to the tractor and to said strut intermediate its ends constraining the upper end of the strut to swing fore-and-aft relative to the tractor in response to vertical movements of the strut by said draft link, the swinging movement of the upper end of said strut being effective through said top link to correspondingly shift said control element.

6. For use with a tractor having a draft link trailingly pivoted thereon for elevation by a power lift device and having a load-responsive type of automatic control including a spring urged slidable control rod in which movement in one direction from a neutral position causes raising of the draft link and movement in the other direction causes lowering of the draft link, a hand lever settable in selected positions each defining a different neutral position for said control rod, a rigid top link having means adjacent its forward end for pivotal connection with said control rod, a conversion attachment for converting said load-responsive control into a position responsive type of control comprising, in combination, a rigid strut pivotally connected at its lower end to said draft link and at its upper end to the rear end of said top link, and an auxiliary member connected between the tractor and a point on said strut intermediate the connections with said draft link and said top link, said auxiliary member having a length proportioned to the length of said draft link so as to constrain the upper end of the strut to swing fore-and-aft as it is raised or lowered by the draft link and to impart to said control rod a movement proportioned to the vertical movement of the draft link.

7. In a hydraulic implement lift for tractors, said implement lift being of the type having a pair of draft links terminally pivoted to the tractor, an elongated rigid member pivoted at its lower end to the other ends of said draft links, drop links secured to said lift arms and said draft links, a control on the tractor for the source of power of the implement lift, a top link terminally pivoted to the upper end of said rigid member and operatively engaging said control; an attachment comprising an auxiliary link, means pivoting one end of said auxiliary link to the tractor, and means pivoting the other end of said auxiliary link to said rigid member intermediate its connections with said draft and top links.

8. The attachment as claimed in claim 7 wherein said auxiliary link is in the form of an elongated bar connected to the rigid member at a different distance than the radii of movement of the pivotal connections of the draft links and the top link with the member.

References Cited in the file of this patent

UNITED STATES PATENTS

| Number | Name | Date |
|---|---|---|
| 2,423,485 | Court | July 8, 1947 |
| 2,510,179 | Johnson | June 6, 1950 |

FOREIGN PATENTS

| Number | Country | Date |
|---|---|---|
| 520,484 | Great Britain | Apr. 25, 1940 |
| 595,740 | Great Britain | Dec. 15, 1947 |
| 74,311 | Norway | Nov. 22, 1948 |